US005509854A

United States Patent [19]
Underwood

[11] Patent Number: 5,509,854
[45] Date of Patent: Apr. 23, 1996

[54] COMBINE ELEVATOR SYSTEM

[75] Inventor: Mark R. Underwood, Burr Oak, Kans.

[73] Assignee: Deere & Company, Moline, Ill.

[21] Appl. No.: 533,644

[22] Filed: Sep. 25, 1995

Related U.S. Application Data

[60] Division of Ser. No. 245,369, May 18, 1994, Pat. No. 5,453,050, which is a continuation-in-part of Ser. No. 80,291, Jun. 21, 1993, Pat. No. 5,380,247.

[51] Int. Cl.$^6$ .................................................. A01F 12/52
[52] U.S. Cl. ................................ 460/13; 460/114; 460/149
[58] Field of Search .............................. 460/13, 114, 12, 460/11, 119, 903, 149; 56/DIG. 2

[56] References Cited

U.S. PATENT DOCUMENTS

| | | |
|---|---|---|
| 629,758 | 8/1899 | Abell . |
| 1,082,191 | 12/1913 | George . |
| 2,420,543 | 5/1947 | Johnson et al. . |
| 2,424,181 | 7/1947 | Messenger et al. . |
| 3,245,413 | 4/1966 | Essex . |
| 3,404,686 | 10/1968 | Johnson et al. . |
| 4,178,944 | 12/1979 | Hanaway . |
| 4,441,511 | 4/1984 | Schroeder ................................ 460/13 |
| 4,489,733 | 12/1984 | Underwood ............................. 56/209 |
| 5,033,932 | 7/1991 | Compton .................................. 460/114 |

*Primary Examiner*—Terry Lee Melius
*Attorney, Agent, or Firm*—James E. Bradley

[57] ABSTRACT

A grain harvesting combine has an elevator system for conveying tailings and clean grain. The tailings are conveyed above the grain storage bin where they enter a chute and flow back to the threshing rotor. A window located at the entrance of the chute cooperates with impellers on the threshing rotor to create a strong downdraft to facilitate flow of the tailings. A stuck crop chamber has a trap door that senses when product jams in the elevator and automatically opens to discharge crop if so.

4 Claims, 4 Drawing Sheets

5,509,854

COMBINE ELEVATOR SYSTEM

CROSS REFERENCE TO RELATED APPLICATIONS

This application is a division of application Ser. No. 08/245,369, filed May 18, 1994, now U.S. Pat. No. 5,453,050 which is a continuation-in-part of application Ser. No. 08/080,291, filed Jun. 21, 1993, "Grain Transportation Apparatus For Combine", now U.S. Pat. No. 5,380,247.

BACKGROUND OF THE INVENTION

1. Field of the invention

This invention relates in general to grain harvesting combines, and in particular to an elevator system for transporting clean grain from the sieve section to the storage bin and tailings from the sieve section to the rotor for rethreshing.

2. Summary of the Prior Art

A grain harvesting combine has a header which cuts the crop and feeds it upward into a threshing rotor. The threshing rotor rotates within a perforated housing, threshing grain from the crop. The threshed grain falls through the perforations onto a grain pan, and from the grain pan onto a set of upper and lower sieves. The sieves are oscillating, causing clean grain to fall through for collection. A blower blows air upward through the sieves, discharging chaff to the rear. Straw from the threshing chamber proceeds through a straw beater and also out the rear.

The clean grain in the prior art type is conveyed to the bin typically by a conveyor which is a combination of horizontal augers and vertical elevators. Incompletely threshed grain will not proceed through the fingers of the sieves, yet is too heavy to be blown out the rear along with the chaff. This grain, called "tailings" or "returns" is returned to the rotor for rethreshing. Typically in the prior art, the tailings are conveyed to the rotor by a separate conveyor which is a combination of augers and elevators.

SUMMARY OF THE INVENTION

The elevator system of this invention employs an elevator housing that extends completely around the combine. The housing has a lower section, an ascending section on one side, an upper section, and a descending section on the other side. This results in a rectangular configuration when viewed in cross section, with the upper and lower sections being parallel to each other and perpendicular to the side sections, which are also parallel to each other.

A linkage, preferable a chain, extends through the elevator housing. A series of paddles are connected to opposite sides of the linkage. A guide for the linkage partitions the elevator housing into a tailings section on one side and a clean grain section on the other side. Preferably the paddles for the clean grain are larger in width, resulting in larger volume compartments for clean grain than for tailings. In an alternate embodiment, the housing is divided into two separate housings.

A tailings chute extends from the upper section of the elevator housing down to the rotor for returning tailings. A window is located in the elevator housing above the entrance to the tailings chute. The spinning rotor preferably has blades on it which create air movement. The window results in a downdraft to facilitate the flow of tailings into the threshing housing.

A stuck crop chamber is located at the junction of the upper section with the descending section. The struck crop chamber extends laterally outward and has a lower opening normally closed by a trap door. The trap door, which is preferably spring-biased, will sense if a build-up of tailings and/or clean grain occurs in the chamber. If so, it opens and discharges the product onto the ground.

DETAILED DESCRIPTION OF THE INVENTION

Figure 1:
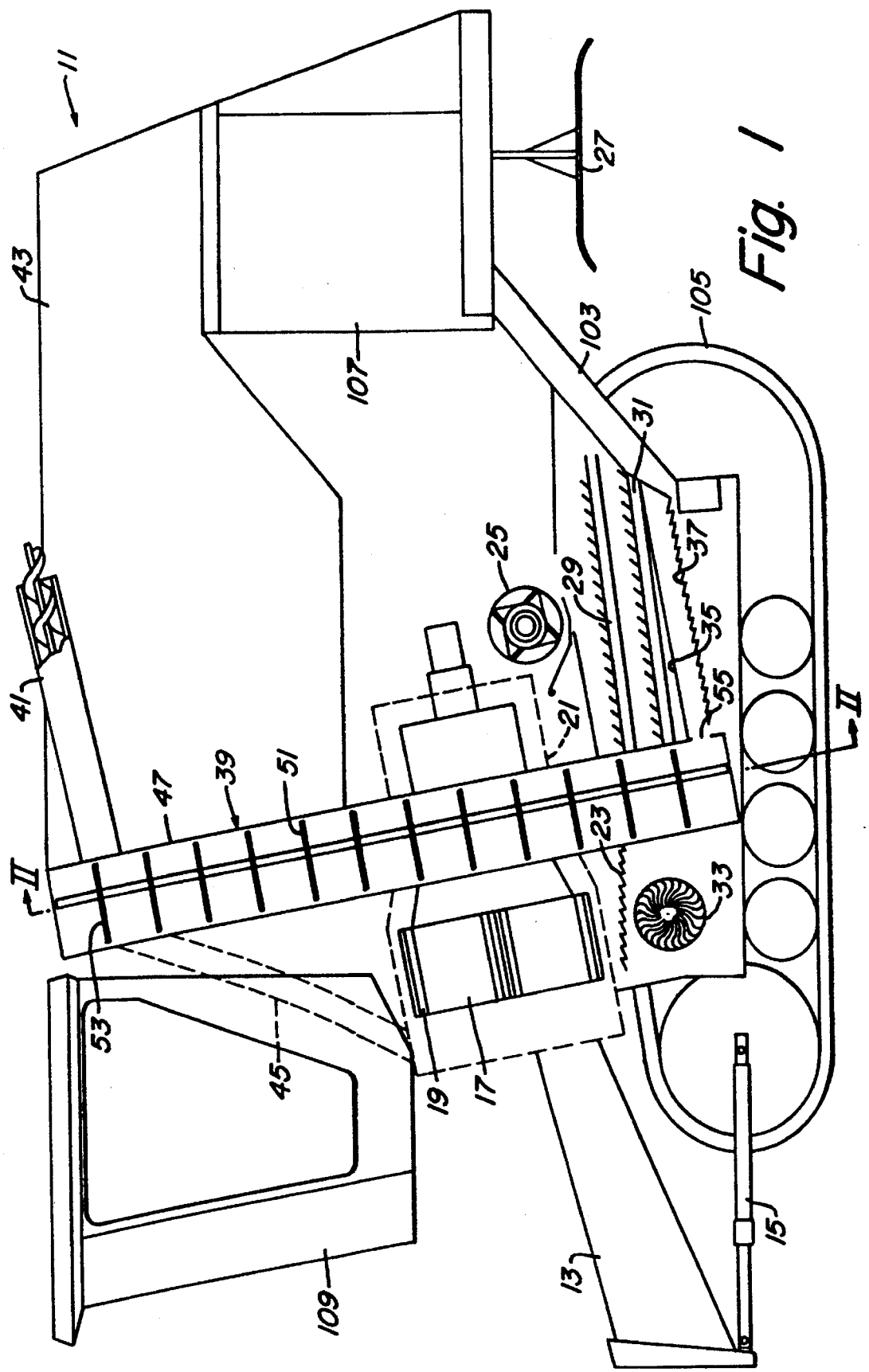
FIG. 1 is a schematic sectional view of a combine constructed in accordance with this invention illustrating the major components.

Referring to FIG. 1, combine 11 has a header support 13 which will secure to a conventional header (not shown) for cutting grain. Header support 13 will pivot upward and downward by means of hydraulic cylinders 15 to control the height of the cut. The header has a sickle which cuts the crop and feeds it upward through the header support 13 to rotor 17. Rotor 17 is oriented axially and is driven rotatably. Rotor 17 has a set of impeller blades 19 on its forward end for drawing the crop in and prethreshing the crop. Rotor 17 is rotated within a perforated housing 21. In the preferred embodiment, housing 21 is also rotated in the same direction, but at a lesser speed.

Grain which is threshed in the clearances between housing 21 and rotor 17 falls through the perforations onto a shoe 23. The grain will move down the shoe in a rearward direction onto sieves 29, 31. The straw from the crop is discharged out the rearward end of the housing 21 into a transverse beater 25 and out the rear end of combine 11. A rotating spreader 27 spreads the straw on the ground.

Sieves 29, 31 are rectangular members that oscillate back and forth. Sieves 29, 31 have a plurality of fingers which define apertures for the properly threshed grain to fall through. A blower 33 blows air upward through the sieves 29, 31 and out the rear of combine 11. Chaff will be blown outward along with the air.

The clean grain falls through sieves 29, 31 onto an inclined clean grain pan 35. Grain which is only partially threshed and thus will not fall through the openings in the sieves 29, 31 will fall down an inclined tailings pan 37 for subsequent rethreshing, because it is too heavy to be blown out with the chaff. The tailings pan 37 is located below the clean grain pan 35.

An elevator 39 will transport the clean grain from the clean grain pan 35. Elevator 39 also will transport the tailings from the tailings pan 37 back to the rotor 17 for rethreshing. The clean grain proceeds up elevator 39 where it is delivered to an auger 41 which distributes the clean grain rearward back into a large storage bin 43. The tailings are carried by elevator 39 up to a chute 45. The tailings flow down the chute 45 back into the clearances between rotor 17 and housing 21.

Elevator 39 includes an elevator housing 47, which is a generally rectangular metal member. Housing 47 extends completely around combine 11, below the sieves 29, 31, above the forward portion of bin 43, and along each side. A chain or drive linkage 49 extends continuously through elevator housing 47. Tailings paddles 51 are mounted to one side of chain 49 for movement therewith. On the otherside, clean grain paddles 53 mount to chain 49. The spaces between the paddles 51, 53 provide compartments for transporting tailings and clean grain. Paddles 53 are preferably about 50% greater in width than tailings paddles 51. This results in greater volume compartments for the clean grain than for the tailings. The tailings enter the tailings side of the elevator housing 47, which is the rearward side, through an opening 55 that registers with the lower end of tailings pan 37. Clean grain pan 35 delivers the grain over the tailings side of elevator housing 47 and into an opening (not shown) that drops the grain into the compartments between the clean grain paddles 53.

Figure 2:
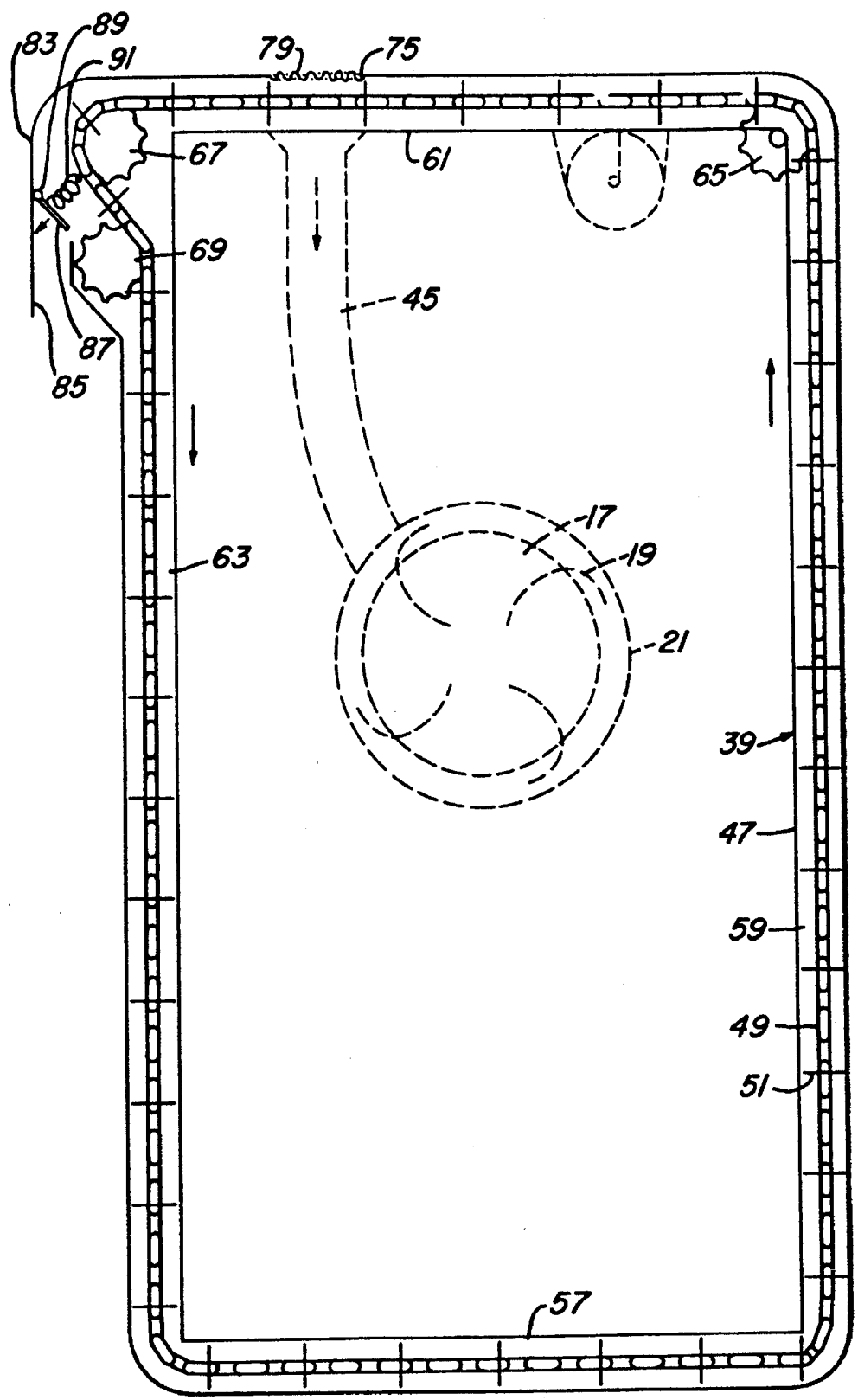
FIG. 2 is a schematic sectional view of the elevator system for the combine of FIG. 1, taken along the line II—II of FIG. 1.

Referring to FIG. 2, elevator housing 47 is generally rectangular in cross-section. Lower section 57 extends below sieves 29, 31 for collecting the clean grain and tailings. The ascending section 59 extends upward at a right angle to lower section 57. Upper section 61 is parallel to lower section 57 and extends over the forward portion of bin 43 (FIG. 1). Descending section 63 is parallel to ascending section 59. The direction of movement of chain 49 is indicated by the arrows, and is counterclockwise when viewed rearward as indicated by the Section II—II of FIG. 1.

Chain 49 is guided by stationary guide shoes (not shown) at the lower corners. A guide sprocket 65 guides chain 49 at the junction of the ascending section 59 with upper section 61. A drive sprocket 67 locates at the junction with upper section 61 and descending section 63. A guide sprocket 69 which serves to adjust tension is located directly below drive sprocket 67. Guide sprockets 65 may alternately be a stationary guide shoes. Drive sprocket 67 is driven by the combine drive system.

Figure 3:
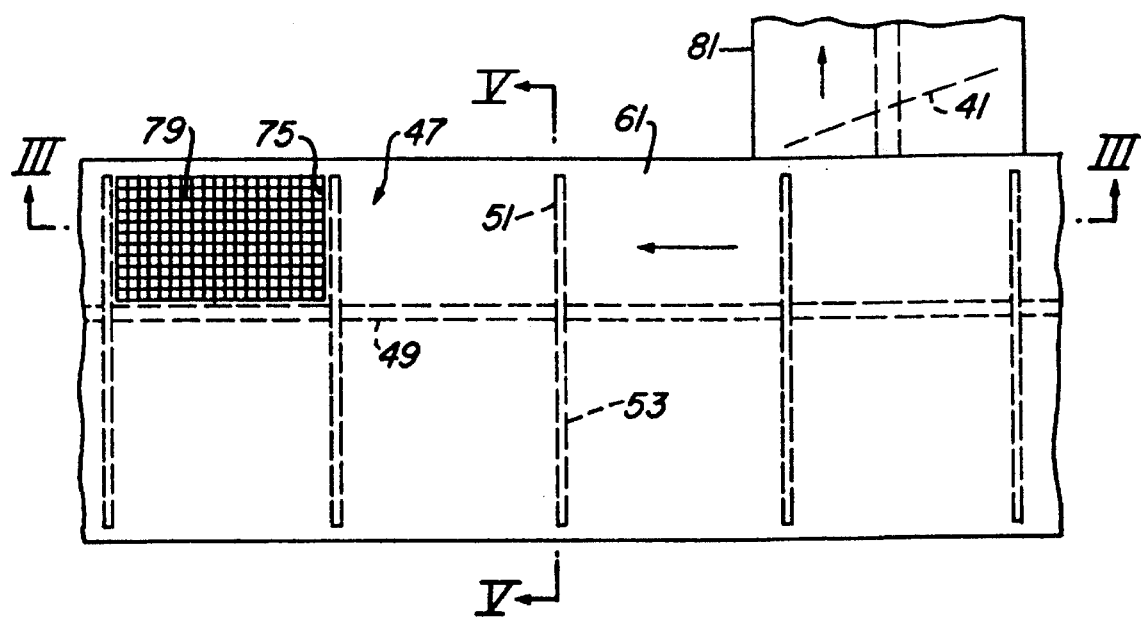
FIG. 3 is a top view of the upper section of the elevator system of FIG. 2.
Figure 4:
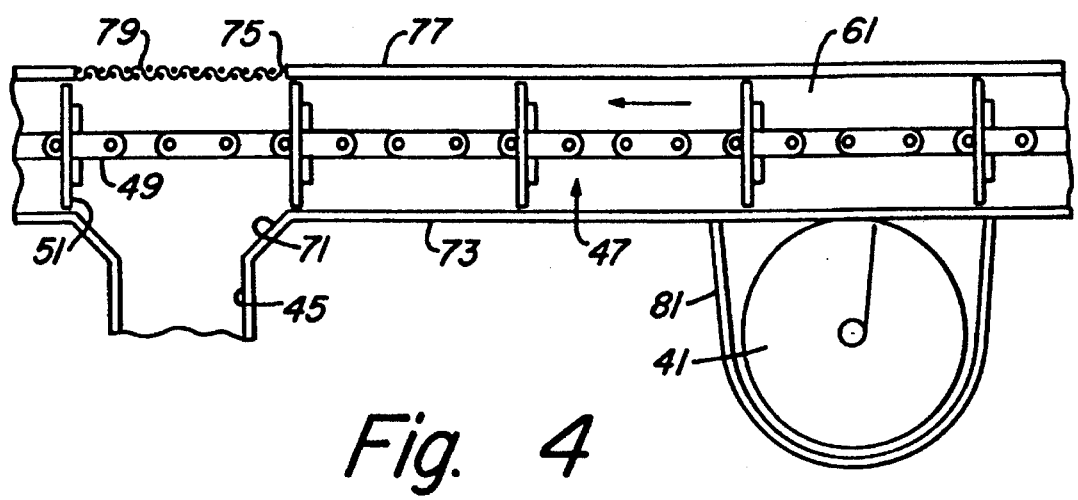
FIG. 4 is a sectional view of the upper section of the elevator system of FIG. 2, taken along the line of IV—IV of FIG. 3.

The tailings chute entrance 71 is shown more clearly in FIG. 4, which is a partial enlarged view of FIG. 2. Chute entrance 71 comprises an opening leading to chute 45, which leads back to housing 21 and rotor 17 (FIG. 3). Entrance 71 is in the lower wall 73 of the upper section 61 of elevator housing 47. A window 75 is located directly above chute entrance 71 in the upper wall 77 of the upper section 61 of elevator housing 47. Window 75, shown also in FIG. 3, extends only over the tailings section of elevator housing section 47 above tailings paddles 51. It does not extend over the clean gain paddles 53. Preferably for safety and to avoid debris, window 75 has a screen 79. The impeller blades 19 of rotating rotor 17 create air movement. The window 75 cooperates with the blades 19 to cause a suction or downdraft that is indicated by the arrow in FIG. 2 illustrated within chute 45.

Referring still to FIG. 4, the clean grain auger 41 is carried in an auger housing 81 which mounts to the lower wall 73 and extends rearward. An opening (not shown) in lower wall 73 discharges clean grain from the clean grain section into auger housing 81.

Referring again to FIG. 2, a jammed crop chamber 83 is located at the Junction of the upper section 61 with the descending section 63 of elevator housing 47. Under certain conditions, debris contained with the tailings and clean grain is carried upward by the elevator 39. This debris may not be able to enter the auger housing 81 or the tailings chute 45 because of its size or stringiness. Possibly, clean grain may not be properly moved out the auger 41 due to a malfunction or jamming. The jammed crop chamber 83 is located downstream of the clean grain auger housing 81 and tailing chute 45 to accommodate any product left in the clean grain and tailings compartments. It is an enlarged area, about twice the lateral width of the remaining portion of elevator housing 47. The jammed crop chamber 83 contains both the drive sprocket 67 and the tension sprocket 69. Jammed crop chamber 83 has a lower discharge opening 85 which faces downward.

A trap door 87 is located above and normally closes opening 85. Trap door 87 has means for sensing if a build-up of product exists in jammed crop chamber 83. Preferably this comprises a hinge 89 which allows trap door 87 to swing from the closed position shown to an open position, indicated by the arrow. A spring 91, schematically shown, provides a bias to prevent door 87 from swinging to the open position unless sufficient crop build-up occurs. The build-up of crop will press against door 87, and when the force overcomes the bias of spring 91, door 87 opens, allowing the jammed crop to flow out and onto the ground. If the product passing through the discharge chamber 83 is not sufficient to push door 87 open, the product returns down the descending section 63.

Figure 5:
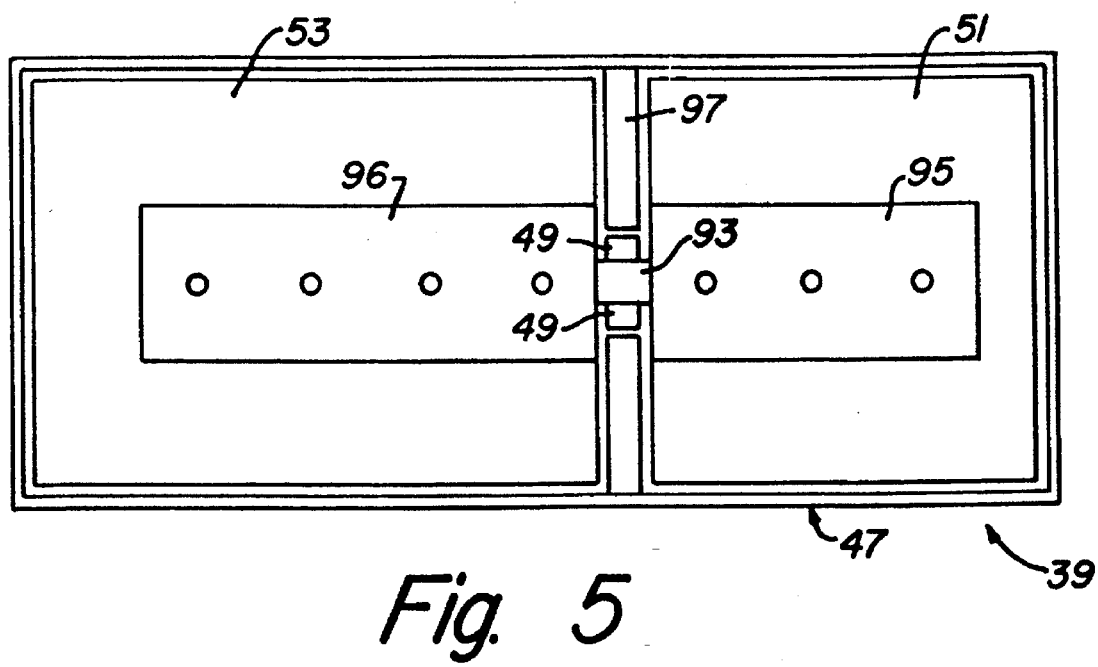
FIG. 5 is a sectional view of the upper section of the elevator system of FIG. 2, taken along the line V—V of FIG. 3.

Referring now to FIG. 5, elevator housing 47 is shown is an enlarged sectional view. A linkage pin 93 extends laterally from each side of chain 49. A brace 95 connected to pin 93 secures each tailings paddle 51 to chain 49. A brace 96 connected to pin 93 secures each clean grain paddle 53 to chain 49. Chain 49 passes through a guide 97, which is a partition or wall with a slot through it which extends completely around the elevator housing 47. Guide 97 prevents clean grain in the clean grain compartments from entering the tailings compartments, and vice versa.

Figure 6:
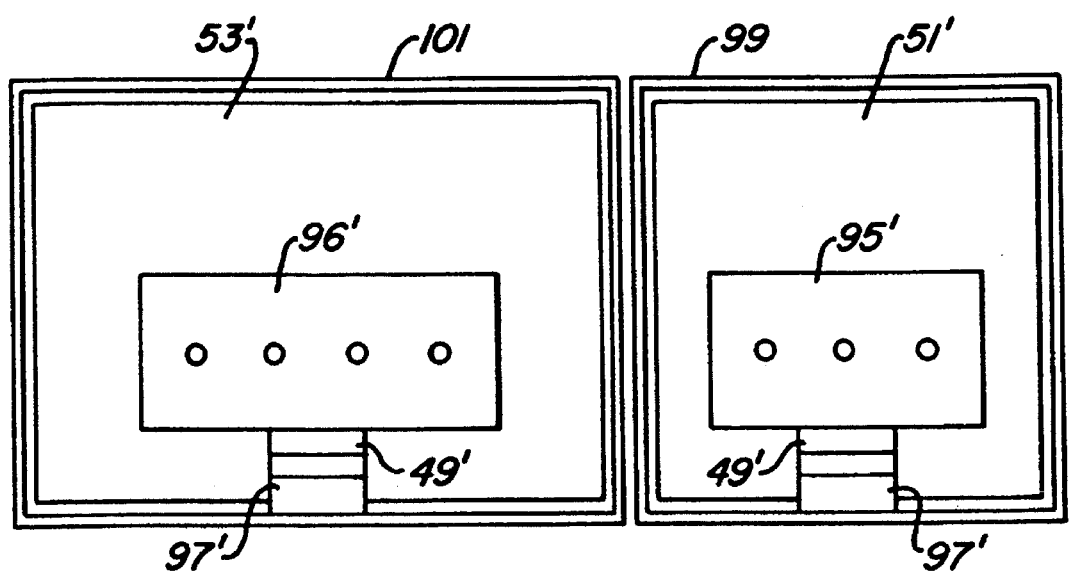
FIG. 6 is a sectional view of an alternate embodiment of an elevator system for the combine of FIG. 1, the view being taken along a sectional line which would be the same as that of FIG. 5.

FIG. 6 shows an alternate embodiment for elevator housing 47. In this instance, the partition means for separating the clean grain compartments from the tailings compartments comprises forming housing 47 into two separate housings 99, 101. Tailings housing 99 and clean grain housing 101 have spaced apart side walls, and each has a separate chain 49'. The drive linkage in this instance thus comprises two separate chains 49'. Tailings housing 99 and clean grain housing 101 are located side-by-side, with the side walls of the housings 99, 101 separating them.

Referring again to FIG. 1, other components of combine 11 include a frame 103 which is mounted in this embodiment on rubber tracks 105. The rubber tracks 105 could be replaced by wheels. An engine 107 supplies power for the tracks 105 as well as the various moving components in combine 11. The operator operates combine 11 from a cab 109.

In operation, the operator will connect header support 13 to a header for cutting grain. The header will sever the crop and pass it up the header support 13 into rotating housing 21. The rotating rotor 17 within the rotating housing 21 threshes the crop. Its straw will be drawn rearward by beaters 25 and distributed by straw spreaders 27.

Clean grain falls through perforations in housing 21 onto shoe 23. The grain proceeds onto the upper sieve 29. The clean grain will fall through apertures in the upper sieve 29, lower sieve 31 and onto clean grain pan 35. Blower 33 discharges air through sieves 29, 31, blowing chaff out the rear of combine 11. Partially threshed tailings fall off the rearward end of the upper sieve 29 and proceed down tailings pan 37.

Chain 49 will be continuously moving. The clean grain will fall into the clean grain compartments between paddles 53 and will be elevated up to auger 41. Auger 41 will discharge the clean grain into storage bin 43. Tailings will enter tailings compartments between tailings paddles 51 and be elevated up to chute 45. As shown in FIG. 7, a downdraft is created due to window 75 and impeller blades 19, facilitating the downward flow of tailings.

Referring still to FIG. 2, should product fail to proceed down chute 45 or out auger 41, it will move down the descending section 63 for subsequent transport again. Should too much product build up for whatever reason in the stuck crop chamber 83, trap door 87 will open to discharge the jammed product out the discharge opening 85 onto the ground. The Jammed product could comprise tailings as well as clean grain.

The invention has sufficient advantages. The downdraft facilitates the removal of tailings back to the rotor. The stuck crop chamber avoids complete jamming of the elevator system. The stuck crop chamber avoids requiring the operator to open a hatch to physically pull stuck crop from the elevator housing. Making the clean grain compartments in the elevator 50% larger than the tailings compartments accommodates for the different relative volumes of product being conveyed upward by the elevator. The differential size allows a smaller elevator housing than if equal size compartments were utilized.

While the invention has been shown in only two of its forms, it should be apparent to those skilled in the art that it is not so limited, but it is susceptible to various changes without departing from the scope of the invention.

I claim:

1. An improved method of returning tailings in a grain combine having a rotating threshing rotor which threshes grain from crop, a sieve section which separates chaff from the grain received from the rotor, a storage bin, a clean grain conveyor which transports clean grain which passes through the sieve section to the storage bin, and a tailings conveyor which transports partially threshed tailings which fail to pass through the sieve section to a chute located above the rotor, the tailings moving through the chute into the rotor for rethreshing, the method comprising:

providing a window in the tailings conveyor adjacent the chute and creating a downdraft due to rotation of the rotor to facilitate movement of the tailings through the chute.

2. The method according to claim 1, further comprising:

providing blades on the rotor, the blades enhancing the downdraft.

3. An improved method of conveying grain products in a grain combine having a rotating threshing rotor which threshes grain from crop, a sieve section which separates chaff from the grain received from the rotor, and a storage bin, the method comprising:

providing an elevator housing assembly which has a lower section extending below the sieve sections, an upper section extending over the storage bin, an ascending side section joining the upper and lower sections on one side of the combine, and a descending side section joining the upper and lower sections on another side of the combine, defining a continuous path;

mounting a continuous drive linkage around the continuous path;

mounting a plurality of spaced apart paddles to the linkage, defining compartments for conveying grain products picked up from the sieve section;

providing a jammed product discharge chamber at the junction of the upper section and descending section of the elevator housing assembly, and providing the discharge chamber with a discharge opening on its lower end;

mounting a trap door in the discharge chamber above the discharge opening;

driving the linkage, receiving into the compartments grain products from the sieve section and transporting at least some of the grain products to the storage bin; and determining if an excessive quantity of the grain products enters the discharge chamber, then if so, opening the door and discharging the grain products in the discharge chamber onto the ground.

4. The method according to claim 3, wherein the step of determining if an excessive quantity of grain products enters the discharge chamber comprises spring biasing the door to a closed position, and opening the door due if a force imposed on the door due to grain products within the discharge chamber exceeds a force imposed by the spring.

* * * * *